United States Patent [19]
Schmidt et al.

[11] 3,831,564
[45] Aug. 27, 1974

[54] METHOD TO REDUCE NOXIOUS COMPONENTS IN INTERNAL COMBUSTION ENGINE EXHAUST GASES, AND APPARATUS THEREFOR

[75] Inventors: Peter Schmidt, Schwieberdingen; Osvaldo Bejerman, Gerlingen, both of Germany

[73] Assignee: Robert Bosch GmbH, Gerlingen-Schillerhohe, Germany

[22] Filed: Dec. 14, 1972

[21] Appl. No.: 314,922

[30] Foreign Application Priority Data
June 20, 1972 Germany............................ 2229928

[52] U.S. Cl. ............. 123/32 EA, 123/119 R, 60/285
[51] Int. Cl. ....................... F02m 7/00, F02m 51/00
[58] Field of Search ................... 123/32 EA; 60/285

[56] References Cited
UNITED STATES PATENTS
3,738,341  6/1973  Loos................................ 123/32 EA
3,745,768  7/1973  Zechnall et al.................. 123/32 EA
3,750,632  8/1973  Zechnall et al.................. 123/32 EA FOREIGN PATENTS OR APPLICATIONS
600,895  4/1948  Great Britain.................... 123/32 EA Primary Examiner—Laurence M. Goodridge
Assistant Examiner—Cort Flint
Attorney, Agent, or Firm—Flynn & Frishauf

[57] ABSTRACT

The composition of exhaust gases is sensed and an electrical signal is derived representative of the composition, which has at least two discrete values. A control signal is generated, the control signal continuously varying in increasing or decreasing direction, for example by utilizing an integrator, and the control signal is applied to control the mass ratio of air and fuel applied to the engine. The direction of variation is controlled in dependence on the discrete value of the control signal. An operating parameter signal of the engine is also generated, and the rate of variation of the continuously varying control signal is changed as a function of the operating parameter signal; the controller typically is an integrating-type controller, in which the integrating rate is changed, as commanded by an engine operating parameter which may, for example, be the flow rate of air being applied to the engine.

12 Claims, 3 Drawing Figures

METHOD TO REDUCE NOXIOUS COMPONENTS IN INTERNAL COMBUSTION ENGINE EXHAUST GASES, AND APPARATUS THEREFOR

Cross reference to related patent and applications: U.S. Patent 3,483,851, Reichardt, December 16, 1969; U.S. Patent 3,745,768, Zechnall et al., July 17, 1973; U.S. Serial 259,157, Schmidt et al., filed June 2, 1972; U.S. Patent 3,759,232, Wahl et al., September 18, 1973; U.S. Serial 259,134, Topp et al., filed June 2, 1972; U.S. Patent 3,782,347, Schmidt et al., January 1, 1974; U.S. Serial 267,562, Eichler et al., filed May 6, 1972; U.S. Serial 282,848, Eichler et al., filed August 22, 1972; U.S. Serial 283,177, Eichler et al., filed August 23, 1972; U.S. Serial 271,009, Scholl, filed July 12, 1972; U.S. Serial 296,601, Schneider et al., filed October 11, 1972; U.S. Serial 298,108, Wahl et al., filed October 16, 1972; U.S. Serial 300,047, Linder et al., filed October 24, 1972; U.S. Serial 316,008, Friese et al., filed December 18, 1972.

The present invention relates to a method to reduce the noxious components in the exhaust systems of internal combustion engines, and to apparatus to carry out the method, and more particularly to such method and apparatus in which the mass ratio of air to fuel is controlled, specifically when utilizing fuel injection systems.

Various methods to control the mass ratio of air and fuel have been proposed. This ratio is usually expressed as the air number lambda ($\lambda$) which has a value of unity when a stoichiometric ratio of fuel to air is present. For gasoline and air, the mass ratio is usually 14.4 : 1, approximately.

Sensors which sense the exhaust gases of internal combustion engines may be made sensitive to the presence of oxygen in the exhaust system, so that, when the air number $\lambda$ changes from less than one to greater than one, a discrete output signal is obtained. This discrete output signal is then utilized to control an integrating-type controller, the direction of the integration being changed upon switch-over of the integrating controller.

It is an object of the present invention to improve control systems, and methods, and particularly to decrease the inertia or delay time inherent in integrating-type controllers, or similarly operating apparatus in which continuously varying control signals are provided, varying in increasing, or decreasing direction in dependence on an output signal. Further, variable dead times, dead zones within the control loop should be considered, such dead times, or dead zones occurring due to the path of the fuel-air mixture from the inlet valve to the outlet valve, and the path of the exhaust gas from the outlet valve to the exhaust system of the internal combustion engine, and then to the sensing element thereof.

SUBJECT MATTER OF THE PRESENT INVENTION

Briefly, at least one of the operating parameters of the internal combustion engine, preferably a parameter which depends on the mass of the inlet air sucked into the internal combustion engine is utilized as a control parameter to control the time constant of the control amplifier, typically the integrating time constant of an integrating amplifier. The apparatus should be simple and inexpensive, and should be capable of reliable operation even under the rough operating conditions of automotive vehicles. The various elements in the control system should respond rapidly, and without dead time, or dead zones, so that inertia and lag in the control system can be essentially avoided. In accordance with a feature of the invention, therefore, the sensing element is connected to a threshold switch which, in turn, is connected with a circuit which controls the direction of integration and, additionally, is responsive to an inlet air flow sensing device.

The invention will be described by way of example with reference to the accompanying drawings, wherein.

Figure 1:
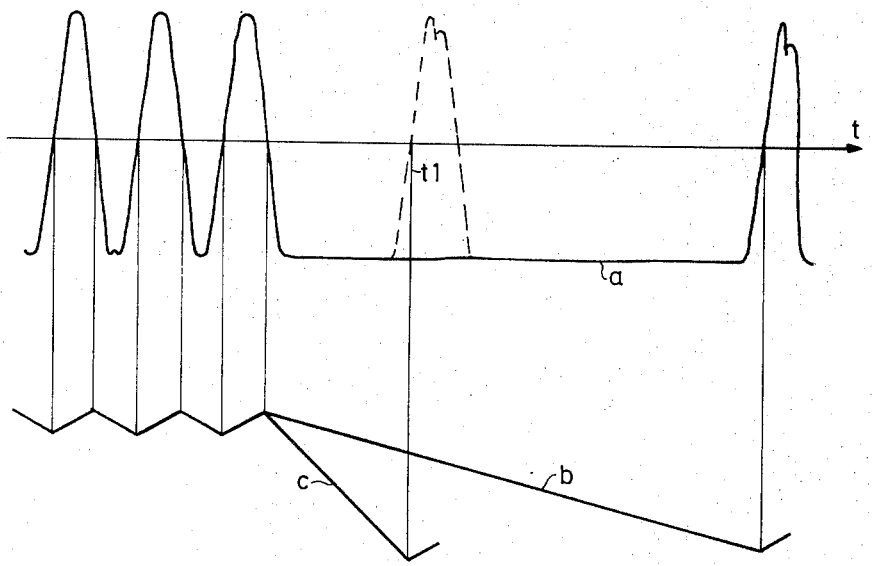
FIG. 1 is a general diagram of the output voltage of a sensing element in the exhaust path of the internal combustion engine, with respect to time, and the respective output signal from the output of the control amplifier.

An exhaust gas sensing device — see the cross referenced applications — provides an output signal which is illustrated in FIG. 1, over time $t$. The curve clearly shows that as the air number $\lambda$ oscillates about the value $\lambda = 1$, the output signal of the sensing device varies rapidly between two limiting or terminal values. The air number $\lambda$ may be so defined that, if a stoichiometric air-fuel mixture is present, $\lambda = 1.0$, thus indicating the mass ratio of air to fuel. When the mixture is lean, the air number will be greater than 1.0; an enriched mixture will have an air number less than 1.0. As seen in FIG. 1, the air number may change by substantial values, for example, upon acceleration of the internal combustion engine. The output signal of the exhaust gas measuring element will remain then constant for a comparatively long period of time, remaining at one of its terminal values.

The voltages which occur at the output signal of the control amplifier are indicated by the graph line $b$. Such a control amplifier, as proposed, includes an integrating controller, that is, the control amplifier integrates with respect to time. Each time that the sensing output voltage goes through zero, there will be a reversal of the direction of integration, so that the air number $\lambda$ will be always controlled to change in the direction of $\lambda = 1.0$, by applying the output from the control amplifier to a suitable fuel, or air measuring device which suitably changes the mass ratio of the fuel, or air, applied to the internal combustion engine. As indicated by curve $a$, the output voltage may remain for a comparatively long period of time at one terminal value. If this were to occur — for example, during acceleration, then a substantial period of time would elapse before the air number $\lambda$ would be controlled back to the value $\lambda = 1.0$, as indicated by the long sloping line $b$.

In order to provide more rapid switch-over, that is, more rapid response of the exhaust control system, the integrating time of the integrating controller is changed. Since the condition of long-term output signal at one limiting value of the exhaust sensor occurs usually upon high acceleration, the amount of air flowing to the inlet manifold of the internal combustion engine can be used as a characterizing parameter, from which an electrical signal can be derived, in order to change the time constant of the control amplifier, and thus provide more rapid response so that the air number λ can be controlled to its desired value more rapidly.

Line c in FIG. 1 illustrates the output signal of such a control amplifier in which the integrating rate is changed. As can be seen, the terminal value at which the exhaust sensing element again provides a signal corresponding to the air number $\lambda = 1.0$ is obtained at a much shorter period of time, namely at $t_1$. Thus, by changing the timing constant of the integrating amplifier in dependence on at least one of the operating parameters of the internal combustion engine, the air number can be controlled more accurately and more rapidly to the desired value of unity.

The exhaust sensing element will, of course, respond to changes in exhaust composition. The controller itself only changes the mass ratio of the input. The mass ratio of the input will, generally, and as seen in the first three curve maxima of FIG. 1, vary rather rapidly about a value of unity, that is, oscillate back and forth. This is due to the fact that the sensing elements change rather quickly between discrete values and do not provide gradually varying analog outputs representative of actual exhaust gas composition, but rather are of the on-off type indicating presence, or absence of a particular exhaust gas component, for example, oxygen. Thus, even if the exhaust gas component is present greatly in excess of that which it should have, the signal will still have only the maximum discrete value which the sensor can provide, and substantially long time may elapse before an ordinary control system, operating in accordance with its usual control system, operating in accordance with its usual control rate will compensate for a large overshoot. By utilizing an operating, or operation, or other parameter of the engine to change the time constant of an integrating controller, or of the control characteristics of the control loop, rapid response, even to large overshoots is ensured.

Figure 2:
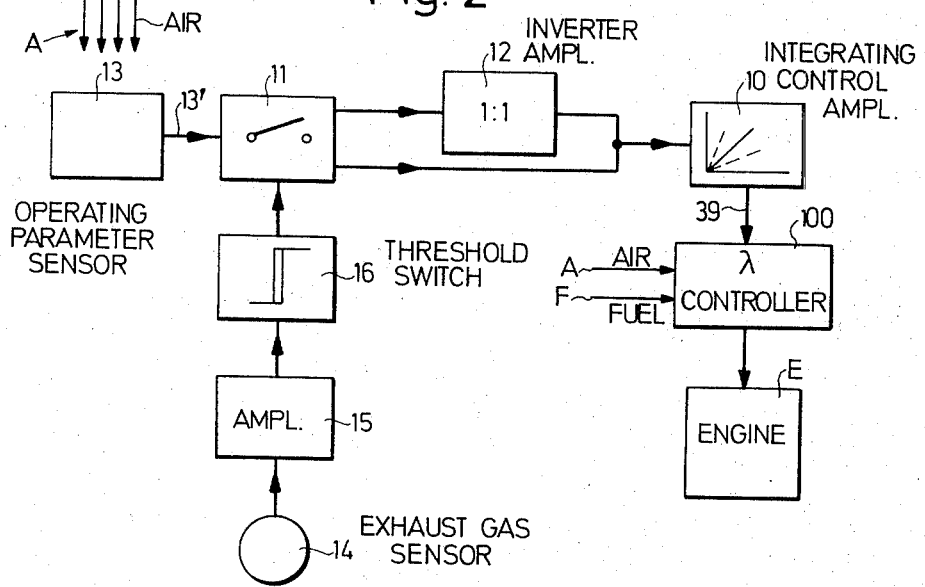
FIG. 2 is a block diagram of a control system in accordance with the invention and carrying out the method.

FIG. 2 illustrates a block diagram of the system in accordance with the invention, in which the timing constant of a control amplifier 10 is changed. Control amplifier 10 is an integrating controller and operates an output transducer 100, schematically indicated as a "lambda"]controller, to which air and fuel are supplied over respective air and fuel lines A and F. The air and fuel are mixed, the mass ratio being determined by the controller 100 and applied to the engine E. The lambda controller 100, in its most simple form, may be a control flap, or valve element located in a bypass duct to the inlet manifold or engine E, the position of the bypass duct determining the amount of additional air, and hence the total amount of air being supplied to the internal combustion engine. The mass ratio of fuel to air can also be changed by different means, for example by changing the amount of fuel being supplied. Electronically controlled fuel injection engines provide a simple way to accurately adjust the amount of fuel by controlling the unstable time of a monostable multivibrator in the fuel injection system, and thus controlling the duration of the opening time of a fuel injection valve. In a simple arrangement, a resistor can be included in the circuit of the fuel injection system, the resistor being variable and additionally commanding or controlling the duration of the unstable time period of the monostable multivibrator, otherwise controlling the opening time of the fuel injection system. For a complete discussion of the fuel injection system, reference is made to the cross referenced U.S. patent and applications.

An exhaust sensor 14 sensing, for example, oxygen concentration in the exhaust gas of the engine E provides an output signal which is applied to an amplifier 15 which controls the output level of a threshold switch 16. The output level of the threshold switch 16 controls the position of a change-over switch 11, either directly to the integrating controller 10, or over an inverter amplifier 12, having an amplification ratio of unity. An input sensing device 13, sensing an operating parameter of the engine, as shown air flow which is schematically indicated by the air arrows A, provides an output signal which is connected to the movable switch 11, to modify the transfer characteristic of the integrating controller 10, regardless of the direction of integration, that is, regardless of switch position of change-over switch 11.

Figure 3:
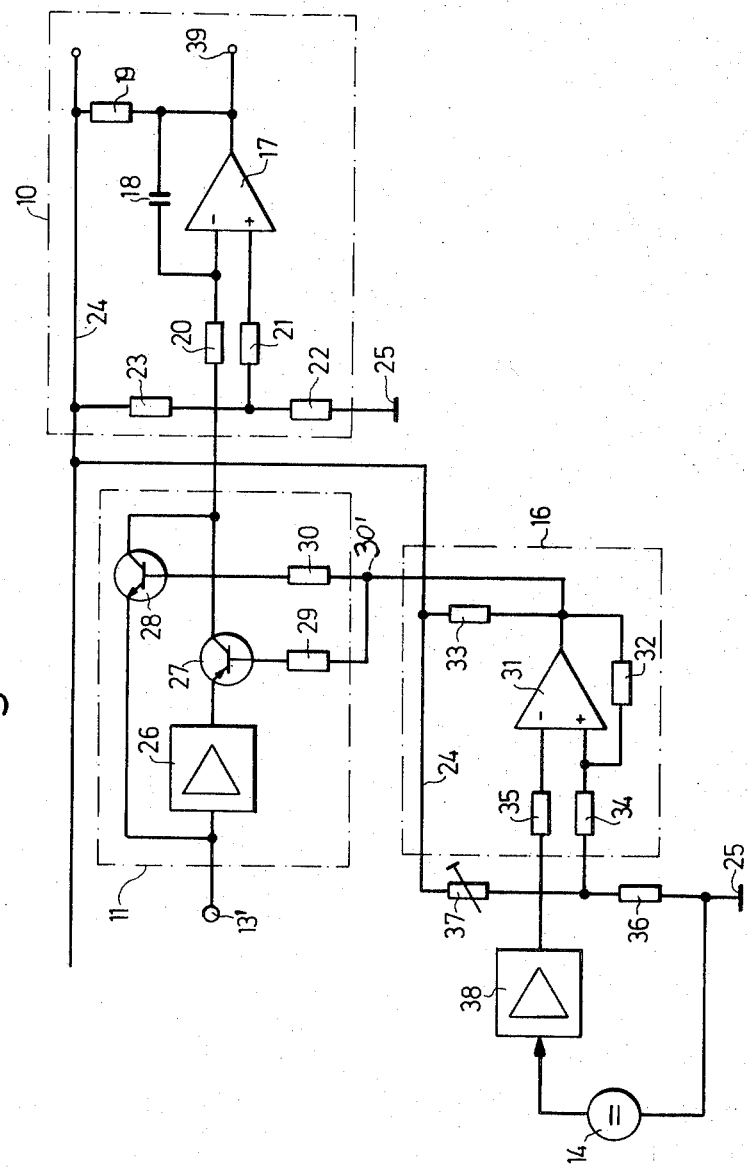
FIG. 3 is a fragmentary block circuit diagram to illustrate the control system of FIG. 2.

Referring to the detailed circuit of FIG. 3: Control amplifier 10 includes an operational amplifier 17 having an integrating capacitor 18 connected between its output and its inverting input. A resistor 19 connects the output to a line of supply. Input resistors 20 and 21 are connected, respectively, to the inverting and non-inverting inputs of the operational amplifier. The non-inverting input, connected to resistor 21, is supplied from the tap or junction point of a voltage divider formed of resistors 22, 23, connected between supply line 24 and chassis or ground 25.

Input resistor 20 is connected to the output of the switching circuit 11, which includes a 1 : 1 inverter amplifier 26, the output of which is connected to the emitter of transistor 27. The collector of transistor 27 is connected to the input of resistor 20. Resistor 20 is additionally connected to the collector of a transistor 28, the emitter of which is connected to a terminal 13' which forms the output of an operating parameter sensor (directly, or through an amplifier), and which is likewise connected to the input of inverter amplifier 26. Thus, the signal from sensor 13, available at terminal 13' is connected either through the inverter amplifier 26 to the transistor 27 or, directly, to transistor 28.

Conduction of the transistors 27, 28 is controlled over the respective base, by means of a base resistor 29, 30, and the polarity of a signal applied thereto at a junction 30', transistor 27 being a pnp, and transistor 28 being an npn type. The base resistors 29, 30 are connected to the output of an operational amplifier 31 which, together with feedback resistor 32 and output resistor 33, and the input resistors 34, 35 forms the threshold switch 16. Input resistor 35 is connected to the inverting input of the operational amplifier 31, and input resistor 34 is connected to the non-inverting input of the operational amplifier 31. The input resistor 34 is connected to the tap or junction point of a voltage divider formed by resistors 36, 37, which are connected across the source of supply voltage. The exhaust sensing element 14, which preferably and suitably is an oxygen sensor, has its active output connected to an amplifier 38, the output of which is connected over resistor 35 to the inverting terminal of operational amplifier 31. The second terminal of the sensor 14 is connected to chassis 25.

The signal at terminal 13' is a signal which is representative of the air mass applied to the internal combustion engine; alternatively, it may be representative of rotational speed of the engine, or another operating, or control parameter thereof. The output of operational amplifier 17, that is output terminal 39, is connected to the lambda controller 100 to change the mass ratio of the fuel-air mixture being applied to the internal combustion engine E.

OPERATION

Let it be assumed that the internal combustion engine has a fuel-air mixture supplied thereto which is too lean. The sensor 14 supplies an output voltage which is low. This low voltage is amplified in amplifier 38. STill, the output voltage of the amplifier 38 is so set to be less than the voltage at the junction point of resistors 36 and 37, so that the operational amplifier 31, which is controlled over the inverting input, will assume an output voltage which is close to that of the common line 24. This output voltage thus is positive and thus controls the npn transistor 28 to become conductive. A positive signal, representative of air mass applied to the engine, is thus applied over transistor 28 to the inverting input of operational amplifier 17. The operational amplifier 17, due to the integrating capacitor 18, thus causes the entire controller 10 to integrate in negative direction, and provide an output signal at the terminal 39 which influences the lambda controller 100 in such a direction that the relative quantity of air which is applied to the internal combustion engine is decreased.

When the lambda controller 100 has changed position sufficiently, so that the quantity of air (or increased quantity of fuel) has enriched the mixture so that the desired value of λ has been passed in negative direction, the output voltage of sensor 14 will rise rapidly, in accordance with the graph of FIG. 1. The output signal of amplifier 38 will rise above the voltage existing at the tap point of resistors 36, 37, operational amplifier 31 will provide a negative output signal and the previously conductive npn transistor 28 will block but the pnp transistor 27 will conduct. The inverter amplifier 26, having an amplification factor of $a = -1$ will thus invert the signal derived from terminal 13', and apply the inverted signal over transistor 27 and resistor 20 to the inverting input of operational amplifier 17 of the control amplifier 10. The inverting input of the operational amplifier 17 will thus have a negative input voltage applied, and the controller 10 will integrate in positive direction. The output signal 39 will act on lanbda controller 100 to increase the amount of air being applied to the internal combustion engine, or, conversely, to decrease the quantity of fuel. Thus, and as is apparent from the diagram of FIG. 3 when read in connection with the graph of FIG. 1, the output voltage of the sensing device 14, connected over the threshold switch 16 determines only the direction in which the integrating voltage of the control amplifier 10 will change, the rate of change being controlled by the parameters of the amplifier 10 itself. In accordance with the present invention, an operating parameter of the internal combustion engine is utilized in order to affect the input signal to the operational amplifier 17, so as to change its rate. Thus, if the internal combustion engine has, for example, too much air applied thereto, as sensed by the sensor 13, the voltage applied to the operational amplifier 17 will become highly positive (or negative, depending upon which one of transistors 27, 28 is conductive), so that the output signal from the operational amplifier 17 will change more rapidly in negative, or positive direction, respectively. This shift will be slow when the quantity of air applied to the internal combustion engine is low, that is, when only little air is permitted to pass to the inlet manifold (indicative, for example, of a partially open throttle), so that only a low input voltage is applied to the inverting input of the operational amplifier. By modifying the magnitude of voltage applied, independently of the polarity, the air number λ is controlled to the desired value more rapidly and without essential delays.

Rather than measuring air flow, for example, by using a well-known hot-wire instrument, or the like, engine speed, manifold vacuum, or the like may also be measured.

The system is particularly useful when combined with internal combustion engines which have electronically controlled fuel injection systems. Fuel injection systems in which electromagnetically operable fuel injection valves are associated with a cylinder, or a group of cylinders of the internal combustion engine are operated synchronously with speed of the engine. Opening of the valves is commanded in synchronism with the rotation of the engine, the opening time of the valve determining the amount of fuel being injected to any particular cylinder, or cylinder group. The opening time itself is controlled by an energy storage device which cooperates with an air quantity sensing element. The inlet manifold of the internal combustion engine may include a movable vane or flap which can be deflected by the inlet air stream against the force of a spring. The temporal average value of air supplied to the engine, as measured by such an air quantity measuring device can be transformed into an electrical signal which will be proportional to the air quantity for each of the suction strokes. The electrical signal can be stored in an energy storage device, and utilized to control the injection period of a fuel injection valve in dependence on the air quantity applied to the internal combustion engine. Since the air quantity measuring device provides a signal which is utilized in the control of the fuel injection system, the very same signal, and without requiring any additional structural elements, can be used to also control the integrating time of controller 10, that is, as the operating parameter sensor 13 connected to terminal 13'. Thus, the present invention can be applied to fuel injection systems of known types without requiring any additional equipment, or sensing devices. Deflection of such a plate, or vane, can be transformed into an electrical signal by sensing rotation of the vane and connecting a potentiometer arm to the rotating shaft, the position of the potentiometer slider forming a measure of the angular deflection of the plate.

Various changes and modifications may be made within the scope of the inventive concept.

We claim:

1. Method to reduce noxious components in the exhaust of internal combustion engines including the steps of sensing the composition of the exhaust gases and deriving a sensed signal representative of such composition, having effectively one of two discrete values;

generating a control signal which is continuously variable with respect to time in increasing, or decreasing direction, in dependence of the discrete value of the sensed signal said generated control signal controlling the mass ratio of the air and fuel being applied to the engine and controlling the direction of variation, in dependence on the discrete value of said control signal;

generating an operating parameter signal having a value varying in accordance with a selected operating parameter of the engine;

and controlling the rate of variation, with respect to time, of said continuously varying control signal as a function of said operating parameter signal.

2. Method according to claim 1, wherein the operating parameter signal is a signal representative of air flow to the engine.

3. Apparatus to reduce noxious components in the exhaust of internal combustion engines having means (100) determining the ratio of air and fuel being applied to the engine comprising means (14, 15, 16) sensing the composition of the exhaust gases and providing a sensed signal representative of such composition which, effectively, has one of two discrete values;

means (10) generating a control signal which is continuously variable, with respect to time, in increasing or decreasing direction, said control signal being connected to said air-fuel ratio determining means (100) to control said ratio, said control signal generating means having its input connected to said sensed signal, the direction of variation being determined by the value of said sensed signal;

means (13) sensing an operating parameter of the engine and deriving an operating parameter signal representative of said sensed parameter;

and means connected to and controlled by said operating parameter signal and additionally connected to and controlling said control signal generating means (10) to control the rate of variation, with respect to time, of said signal as a function of said sensed parameter.

4. Apparatus according to claim 3, wherein said operating paramter sensing means comprises means sensing air flow to the engine.

5. Apparatus according to claim 3, wherein the means sensing the composition of the exhaust gas and providing the sensed signal comprises an exhuast gas sensing element (14) and a threshold switch (16) connected thereto and providing said discrete signals.

6. Apparatus according to claim 5, further comprising a transfer switch (11) having a pair of control outputs connected to the input of said continuously variable control signal generating means, the state of the transfer switch being controlled by the state of said threshold switch (16).

7. Apparatus according to claim 6, wherein said operating parameter sensing means (13) is connected to said transfer switch to apply the operating parameter signal to the continuously variable signal generating means (10) regardless of position of said transfer switch.

8. Apparatus according to claim 3, wherein the continuously variable signal generating means (10) comprises an integrating amplifier (17);

an inverter circuit (12, 26) is provided connected to one input of the integrating amplifier and a transfer switch (11) is provided having a pair of outputs, one each connected, respectively, to the integrating amplifier directly or to the integrating amplifier through the inverter circuit;

and said operating parameter sensing signal is applied to the transfer switch to be connected to the integrating amplifier in either respective paths.

9. Apparatus according to claim 8, wherein the transfer switch comprises two switching transistors (27, 28) having their outputs connected to the integrating amplifier (10), the conduction controlling electrodes (bases) of said transistors being connected to the control by said discrete signals;

and one other electrode of one the transistors being connected to the operating parameter signal directly, the similar electrode of the other transistor being connected to the operating parameter sensing signal with inverted polarity.

10. Method according to claim 1, wherein the step of generating said continuously varying control signals comprises the step of integrating the sensed signal in the direction determined by the specific value of said discrete values;

and the step of controlling the rate of variation of said control signal comprises controlling the integration rate as a function of said operating parameter signal, the direction of integration being determined by said specific value of said discrete values.

11. Apparatus according to claim 3, wherein the means generating the continuously variable control signals comprises an integrator (10) including means (13') controlling the integration rate of said integrator, connected to said integrator, and controlling the integrator to integrate at a rate which is a function of said sensed parameter, and in a direction as determined by the value of said senses signal.

12. Apparatus according to claim 11, wherein the means sensing the composition of the exhaust gas and providing said senses signal comprises an exhaust gas sensing element (14) and a threshold switch (16) connected thereto and providing said discrete signals;

a transfer switch (11) is provided, having a pair of controlled outputs connected to the input of said integrator (10), the state of the transfer switch being controlled by the state of said threshold switch (16) and controlling the integrator to integrate in one, or the other direction of integration;

and said operating parameter sensing means (13) is connected to the transfer switch to apply said operating parameter signal to said integrator (10) in accordance with the position of said transfer switch to control the integrator to integrate in the direction, as commanded by the position of said transfer switch under control of said threshold switch, and at an integration rate which is a function of said operating parameter signal.

* * * * *